United States Patent
Chorafakis et al.

(10) Patent No.: US 9,887,923 B2
(45) Date of Patent: *Feb. 6, 2018

(54) OPPORTUNISTIC WIRELESS RESOURCE UTILIZATION USING DYNAMIC TRAFFIC SHAPING

(71) Applicant: Sonus Networks, Inc., Westford, MA (US)

(72) Inventors: Idomeneas Chorafakis, Toronto (CA); Seyed Mohammad Ali Arad, Richmond Hill (CA)

(73) Assignee: Sonus Networks, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,394

(22) Filed: Apr. 26, 2017

(65) Prior Publication Data

US 2017/0230299 A1   Aug. 10, 2017

Related U.S. Application Data

(63) Continuation of application No. 13/600,089, filed on Aug. 30, 2012, now Pat. No. 9,705,804.

(51) Int. Cl.
*H04L 12/815* (2013.01)
*H04L 12/869* (2013.01)
(Continued)

(52) U.S. Cl.
CPC ........... *H04L 47/22* (2013.01); *H04B 17/336* (2015.01); *H04L 43/0847* (2013.01);
(Continued)

(58) Field of Classification Search
CPC ..... H04L 47/22; H04L 47/6275; H04L 47/50; H04L 47/52; H04L 47/521; H04L 47/522;
(Continued)

(56) References Cited

U.S. PATENT DOCUMENTS

| | | | |
|---|---|---|---|
| 2005/0141424 A1* | 6/2005 | Lim | H04L 47/24 370/235 |
| 2010/0061235 A1* | 3/2010 | Pai | H04L 12/2801 370/230.1 |
| 2010/0074119 A1* | 3/2010 | Krishnaswamy | H04L 47/10 370/242 |

* cited by examiner

*Primary Examiner* — Charles C Jiang
*Assistant Examiner* — Oussama Roudani
(74) *Attorney, Agent, or Firm* — Stephen T. Straub; Ronald P. Straub; Michael P. Straub

(57) ABSTRACT

Systems and methods which provide resource sharing techniques implementing opportunistic shared resource utilization using dynamic traffic shaping are disclosed. Embodiments implement a multi-part transmission frame generation process in which data packets of various different traffic flows are selected for the transmission frame to fill the frame capacity. For example, scheduling logic may apply traffic shaping logic to select data packet queues from which data packets are to be included in a frame and to initially determine a number of packets to be included in the frame from each selected data packet queue according to the traffic shaping logic. Thereafter, the frame may be analyzed to determine if excess capacity remains. The scheduling logic may then apply traffic shaping logic to the data packet queues to implement an opportunistic scheme for including additional data packets in the frame and thereby fill the excess capacity.

20 Claims, 3 Drawing Sheets

(51) Int. Cl.
*H04B 17/336* (2015.01)
*H04L 12/26* (2006.01)
*H04L 12/865* (2013.01)

(52) U.S. Cl.
CPC ...... *H04L 43/0882* (2013.01); *H04L 43/0894* (2013.01); *H04L 47/60* (2013.01); *H04L 47/6275* (2013.01)

(58) Field of Classification Search
CPC ... H04L 47/524; H04L 47/527; H04L 47/528; H04L 47/54
See application file for complete search history.

OPPORTUNISTIC WIRELESS RESOURCE UTILIZATION USING DYNAMIC TRAFFIC SHAPING

RELATED APPLICATION

The present application claims the benefit of U.S. patent application Ser. No. 13/600,089 filed on Aug. 30, 2012 which is hereby expressly incorporated by reference in its entirety.

TECHNICAL FIELD

The invention relates generally to wireless communications and, more particularly, to opportunistic wireless resource utilization using dynamic traffic shaping.

BACKGROUND OF THE INVENTION

The use of various devices which facilitate communications and/or which themselves utilize communications has become nearly ubiquitous. For example, personal computers (PCs), personal digital assistants (PDAs), electronic book readers, cellular telephones, personal media players, etc. widely in use today often utilize network connectivity, such as to provide user communication links, upload/download of content, operations and control communication, etc. Accordingly, various network infrastructure has been deployed to provide networks, such as local area networks (LANs), metropolitan area networks (MANs), wide area networks (WANs), and the Internet, facilitating the foregoing communications.

A number of different resource sharing techniques have been implemented to enable different types of traffic competing for shared links in the foregoing networks to receive a portion of available capacity while attempting to achieve a required quality of service (e.g., as may be measured by parameters such as throughput, delay, jitter, and packet loss). Such resource sharing techniques typically implement algorithms, such as scheduling algorithms or traffic shaping algorithms, in network devices, such as switches and routers, of the network infrastructure. Such scheduling algorithms operate to select which packets among a group of competing network flows will be chosen to be transmitted and in which order. The aforementioned traffic shaping algorithms operate to determine what portion of the available shared link capacity will be assigned to a particular flow or collection of data packets at any given time.

A scheduling algorithm implementing strict priority scheduling, for example, allows network devices to give priority to specific types of traffic over others when deciding how to allocate available shared link capacity. Such a scheduling algorithm may be beneficial when certain traffic (e.g., voice traffic) that is sensitive to network performance (e.g., delay and jitter) is being serviced and thus needs to be prioritized above other traffic types. However, such strict priority scheduling can result in the high priority traffic consuming all or most of the available shared link capacity during periods of heavy demand, thereby starving (i.e., failing to serve or under serving) traffic that is deemed to be of lower priority. Fair scheduling may alternatively be implemented, whereby a share of the link bandwidth is assigned to the various types of traffic without applying a strict priority to the traffic flows. For example, a traffic shaping algorithm may be used in conjunction with a scheduling algorithm in an effort to ensure that bandwidth of an available shared link is distributed among competing flows in a way that allows all types of traffic receive at least some minimum share of the link capacity.

In implementing traffic shaping, network administrators define the minimum and peak bandwidth (i.e., a predetermined number of bits) or fixed allocation range (e.g., a predetermined minimum and peak bandwidth in number of bits) that can be consumed by the different traffic types such that all flows receive at least the minimum level of the shared link capacity. Such traffic shaping bandwidth allocations, although preventing starving lower priority traffic, limit the link usage efficiency. That is, the minimum bandwidth reserved for the different traffic types is not available for use by other flows, even if there is no demand for the reserved bandwidth by its corresponding traffic type at any given moment. This limitation of traffic shaping algorithms often results in less than 100% link utilization.

As can be appreciated from the foregoing, there are various resource sharing techniques that may be implemented, each of which presents associated benefits and challenges. When provisioning network devices to implement the foregoing resource sharing techniques, operators must typically choose the particular algorithms to be implemented and their associated parameters that dictate how the system will distribute available shared link capacity between competing traffic. These choices are static, usually established upon deployment or upon substantial network reconfiguration, and are based upon the fixed bandwidth of the wireline network links for which the techniques were designed. Accordingly, resource sharing techniques, such as scheduling and traffic shaping experience significant challenges if implemented in wireless applications where the link capacity changes over time.

BRIEF SUMMARY OF THE INVENTION

The present invention is directed to systems and methods which provide resource sharing techniques implementing opportunistic shared resource utilization using dynamic traffic shaping. The opportunistic resource sharing techniques of embodiments facilitate high resource utilization while providing a level of fairness (e.g., avoiding starving low priority traffic even at times where demand for wireless resources exceeds available capacity). In operation according to embodiments of the invention, implementation of opportunistic resource sharing achieves 100% shared resource (e.g., wireless link) utilization while accommodating selection and configuration of different priorities for different traffic flows, whether based upon type of traffic, quality of service (QoS), particular origination/destination subscriber/subscriber equipment, particular origination/destination port, etc. (referred to collectively as traffic groupings). Embodiments additionally or alternatively allow limits with respect to the use of shared resource capacity by any particular traffic based on changing channel conditions and network demands. Accordingly, opportunistic resource sharing techniques of embodiments herein are operable to adapt as conditions of the shared resource (e.g., wireless channel conditions) change to ensure that different traffic flows continue to receive a desired QoS.

Embodiments of the invention implement a multi-part transmission frame generation process in which data packets of various different traffic flows are selected for the transmission frame to fill the frame capacity. For example, scheduling logic of embodiments may apply traffic shaping logic to select data packet queues from which data packets are to be included in a frame and to initially determine a number of packets to be included in the frame from each selected data packet queue according to the traffic shaping logic. Thereafter, the frame may be analyzed to determine if excess capacity remains. The scheduling logic of embodiments may then apply traffic shaping logic to the data packet queues to implement an opportunistic scheme for including additional data packets in the frame and thereby fill the excess capacity. Accordingly, the foregoing opportunistic resource sharing multi-part transmission frame generation process may achieve 100% wireless link utilization through transmission of full capacity frames while allowing selection and configuration of different priorities for different traffic flows.

Embodiments of the invention operate to adjust traffic shaping thresholds for different traffic groupings based on the wireless link current channel capacity, thereby providing channel based dynamic traffic shaping. Embodiments additionally or alternatively operate to adjust traffic shaping based on the existing traffic demand, thereby providing traffic based dynamic traffic shaping.

It can be appreciated from the foregoing that the combination of scheduling and traffic shaping implemented according to opportunistic resource sharing techniques of embodiments herein may operate to provide strict priority among different traffic groupings, thereby providing access to the shared wireless link in a prioritized way, while applying traffic shaping so that the shared wireless link capacity may be divided up among competing traffic types in a fair way. Moreover, such embodiments of opportunistic resource sharing techniques are also enabled to make maximum wireless link utilization to thereby fill 100% of available channel capacity regardless of the particular traffic demand present at any given moment in time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
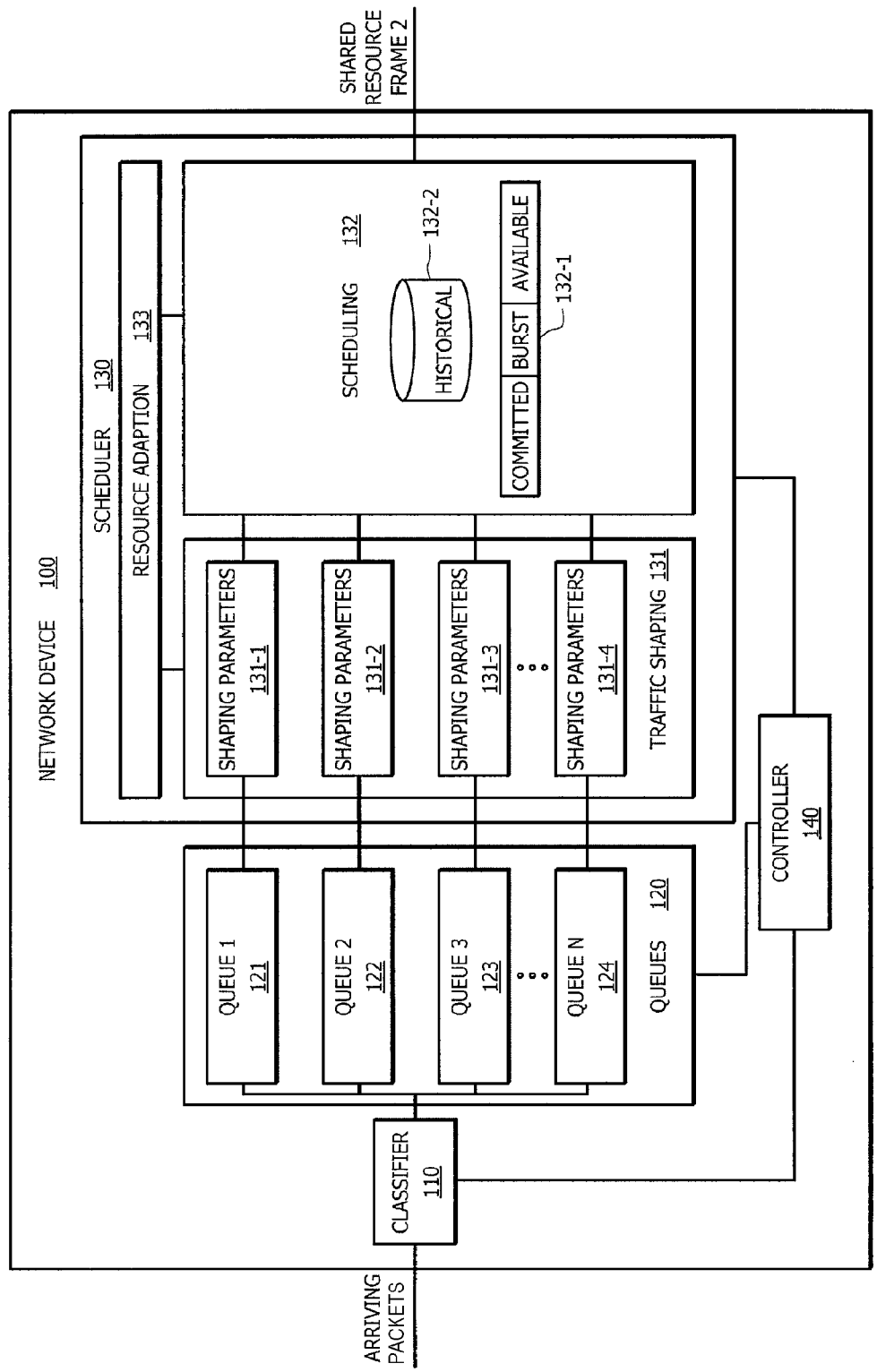
FIG. 1 shows a network device adapted to provide opportunistic resource sharing according to embodiments of the invention.

FIG. 1 shows network device 100 adapted to provide opportunistic resource sharing according to embodiments of the invention. Network device 100 may comprise any of a number of devices disposed in a network data path, such as a router, a switch, an access point, a repeater, a gateway, etc. Regardless of what form of network device implements the opportunistic resource sharing techniques of embodiments herein, the network device is preferably disposed to arbitrate data communication with respect to one or more shared resource, such as a wireless network link, for which opportunistic resource sharing is desired. For example, one or more network devices adapted according to the concepts herein may be disposed at various points in networks where wireless links are implemented, as shown in FIG. 2.

Figure 2:
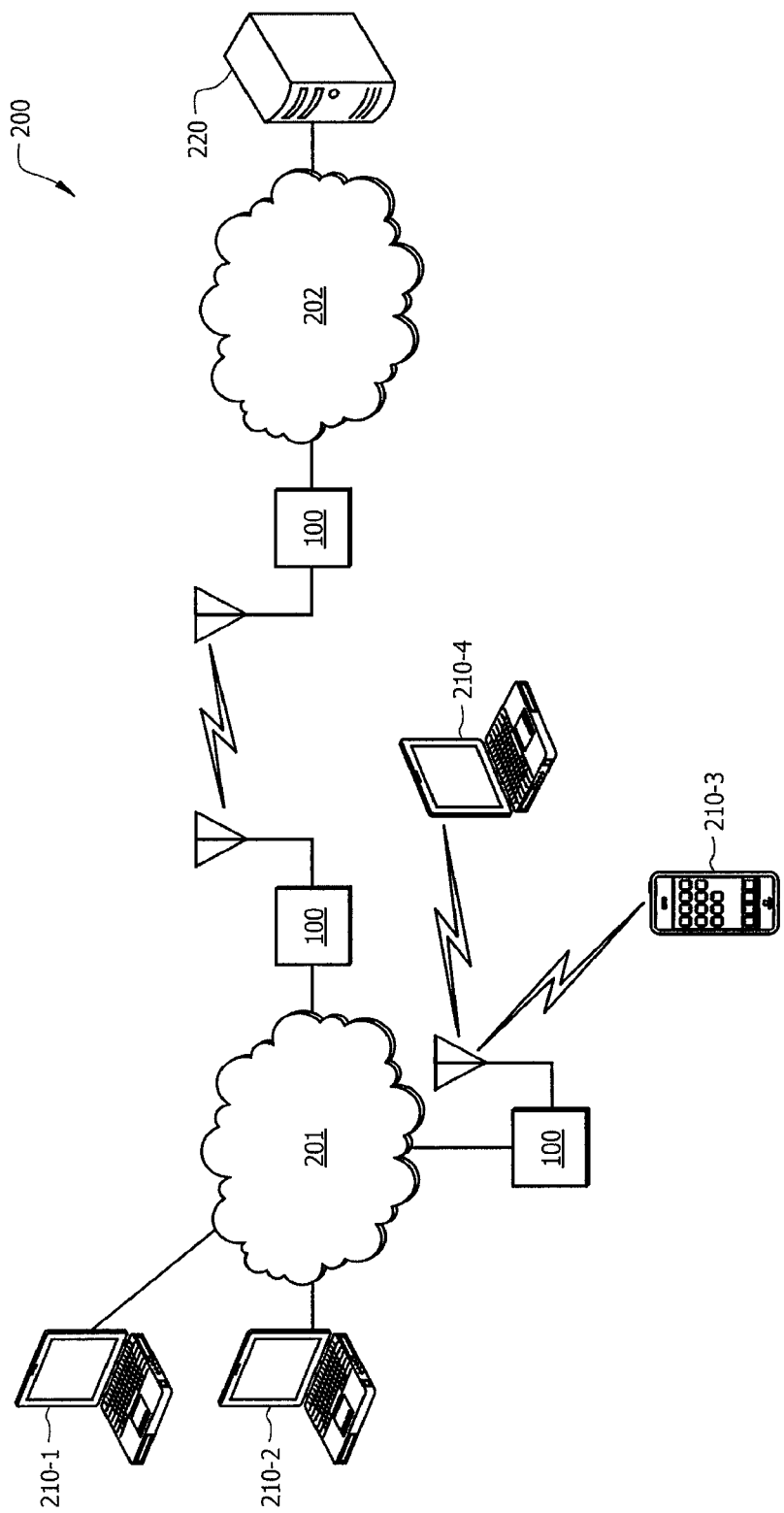
FIG. 2 shows a system in which various network devices adapted to provide opportunistic resource sharing according to exemplary embodiments herein are deployed.

FIG. 2 shows system 200 in which various network devices adapted to provide opportunistic resource sharing according to exemplary embodiments herein are deployed. System 200 of the illustrated embodiment comprises a plurality of networks (shown as networks 201 and 202) facilitating communication with respect to a plurality of subscriber equipment (shown as subscriber equipment 210-1 through 210-4) and/or other network devices. The networks of system 200 may comprise various forms of networks suitable for providing desired data communication. For example, network 201 may comprise one or more of a personal area network (PAN), local area network (LAN), a metropolitan area network (MAN), a wide area network (WAN), etc. while network 202 may comprise one or more of the Internet, the public switched telephone network (PSTN), a cellular telephony network, etc. The subscriber equipment may comprise various devices which facilitate communications and/or which themselves utilize communications, such as PCs (e.g., subscriber equipment 210-1, 210-2, and 210-4), PDAs, electronic book readers, cellular telephones, smart phones (e.g., subscriber equipment 210-3), personal media players, etc.

Network devices 100, implementing opportunistic resource sharing techniques according to embodiments of the invention, are disposed at points in the illustrated embodiments of system 200 where wireless links are implemented by networks 201 and 202. For example, one or more of network devices 100 shown in FIG. 2 may comprise a switch, a router, an access point, a gateway, a repeater, etc. It should be appreciated that although embodiments of network devices 100 may be integrated into a host device, such as the aforementioned switches, routers, access points, gateways, repeaters, and/or subscriber equipment (e.g., subscriber equipment 210-3 and/or 201-4), alternative embodiments of network devices 100 may be provided, whether fully or partially, as one or more separate device operable with one or more other network devices to provide opportunistic resource sharing according to the concepts herein.

The shared resources for which opportunistic resource sharing is provided may, for example, comprise wireless links terminating with subscriber equipment, wireless links providing one or more hop of a multi-hop network connection, wireless backhaul links, etc. It should be appreciated that, although embodiments are described herein with respect to wireless links, opportunistic resource sharing techniques in accordance with the concepts herein may be utilized with respect to other shared resources, including wireline links (e.g., multiplexed or trunked wireline links), if desired.

Referring again to FIG. 1, network device 100 of the illustrated embodiment comprises classifier 110, queues 120, scheduler 130, and controller 140. As described in detail below, classifier 110, queues 120, and scheduler 130 of the illustrated embodiment operate under control of one or more processors of controller 140 to provide resource sharing implementing opportunistic wireless resource utilization using dynamic traffic shaping to facilitate high resource utilization while providing a level of fairness.

As can be appreciated from the foregoing, network device 100 of the illustrated embodiment comprises a processor-based system in which one or more processors control operation to implement functionality as described herein. Controller 140 of embodiments may comprise any of a number of processor configurations, such as a general-purpose processor (e.g., a processor from the PENTIUM or CORE line of processors available from Intel, Inc.), a special purpose processor (e.g., an application specific integrated circuit (ASIC)), a configurable processor (e.g., a field programmable gate array (FPGA)), and combinations thereof. Accordingly, classifier 110, queues 120, and/or scheduler 130 may be implemented, at least in part, as logic code executable upon a processor of controller 140. For example, any of classifier 110, queues 120, and scheduler 130 may be implemented as software and/or firmware code operable upon a processor of controller 140 and corresponding circuitry (e.g., memory, interfaces, sensors, logic gates, comparators, etc.) to provide operation as described herein. It should be appreciated that, although shown as a single functional block, controller 140 may comprise a plurality of individual controllers cooperative to provide operation in accordance with the concepts of the present invention. For example, controller 140 of embodiments may comprise individual processing circuits for any or all of classifier 110, queues 120, and scheduler 130, if desired.

Classifier 110 of embodiments is adapted to accept arriving data (e.g., data packets communicated through a network data path in which network device 100 is disposed) and to analyze the data for assignment to a particular queue of queues 120. For example, classifier 110 may analyze information contained in data packets themselves, information regarding the traffic flows to which the data packets are associated, information regarding protocols used with respect to the data packets, information regarding the network routing of the data packets, information regarding the ports the data packets are received on, etc. in order to make traffic grouping determinations with respect to data packets for which opportunistic resource sharing is to be provided. In operation according to embodiments, classifier 110 may analyze data packet header information, data packet payload information, data packet data flow information, data packet source information, data packet destination information, data packet port information, data packet protocol information (e.g., Ethernet priority bits, IPv4 ToS or DSCP bits), and/or other information associated with the data packets to determine appropriate traffic type based traffic groupings for the individual data packets. Additionally or alternatively, classifier 110 may analyze data packet data type information, data packet data flow information, data packet source information, data packet destination information, and/or other information associated with the data packets to determine QoS based traffic groupings for the individual data packets. Similarly, classifier 110 may analyze data packet flow information, data packet header information, data packet source information, data packet destination information, and/or other information associated with the data packets to determine appropriate subscriber/subscriber equipment based traffic groupings for the individual data packets.

The foregoing traffic groupings may be created, such as by a network operator, user, etc., to provide desired levels of QoS, network performance, etc. For example, traffic groupings may be predetermined (e.g., prior to deployment of the network device), established ad hoc (e.g., at time of deployment, during system maintenance, etc.), established dynamically (e.g., when undesired performance is experienced), and/or the like. Accordingly, traffic groupings may be created/revised based upon predicted network operation, simulations, empirical data, etc.

Queues 120 of embodiments is adapted to provide a plurality of data queues (shown in the illustrated embodiments as queues 121-124) for queuing data packets awaiting scheduling by scheduler 130. For example, queues 121-124 may each provide a first-in-first-out (FIFO) memory of sufficient size (e.g., 4 Mb) to service data traffic of a network path in which network device 100 is to be disposed. Individual data queues of queues 120 are preferably associated with particular traffic groupings. For example, data queues of queues 120 may each be associated with a different traffic type, QoS, subscriber/subscriber equipment, etc. of the traffic groupings implemented for opportunistic resource sharing according to the concepts herein. Accordingly, data packets may be stored in a particular queue of queues 120 in accordance with traffic grouping determinations made by classifier 110.

Some data traversing a network path in which network device 100 may be disposed may not be associated with a particular traffic grouping. Accordingly, queues 121-124 of embodiments may not only include queues associated with a corresponding one of the traffic groupings, but may also include one or more queue (e.g., default queue) for use with respect to data packets which are not determined to be of a particular traffic grouping.

It should be appreciated that the number of queues shown in the illustrated embodiment is merely illustrative of the number of queues which may be implemented according to the concepts herein. Embodiments of the invention preferably include at least a number of queues to accommodate a number of traffic groupings implemented. Additionally, one or more additional queues may be provided (e.g., default queue, overflow queue, etc.), if desired.

Scheduler 130 is adapted to provide a multi-part transmission frame generation process in which data packets of various different traffic flows are selected to fill the frame capacity of a transmission frame to be transmitted using a shared resource (e.g., wireless network link). Accordingly, scheduler 130 of the illustrated embodiment comprises traffic shaping logic 131 and scheduling logic 132 operable cooperatively to provide the aforementioned multi-part transmission frame generation. Scheduler 130 of the illustrated embodiment further comprises resource adaption logic 133, shown in communication with traffic shaping logic 131 and scheduling logic 132, for facilitating opportunistic data packet transmission according to concepts herein.

Traffic shaping logic 131 of embodiments provides traffic shaping which, when applied through operation of scheduling logic 132, is operable to initially select data packet queues of queues 120 from which data packets are to be included in a frame. Shaping parameters (shown as shaping parameters 131-1 through 131-4) associated with each such queue are utilized by traffic shaping logic 131 for initially determining a number of packets from the corresponding active queues (queues that contain data waiting to be forwarded) to be included in the frame. In operation according to embodiments, the shaping parameters may establish a hierarchy of the queues, and thus a hierarchy of the traffic groupings corresponding to the queues, and/or a relative amount of the frame being filled to be allocated to the queues. Using the frame allocation information provided by the shaping parameters, application of traffic shaping logic 131 by scheduling logic 132 may initially determine a number of data packets from one or more of the individual active queues of queues 120 for inclusion in the frame being generated (e.g., frame 132-1).

Frame allocation information of the shaping parameters may provide a variable or relative amount of the available payload capacity of the frame (which may itself be various, such as in wireless links of embodiments herein) to be initially allocated to data packets of an associated queue. Queue hierarchy information of the shaping parameters may be utilized to select the particular queues from which data packets are to be included in the frame. For example, the queue hierarchy may be referenced to select queues, from which data packets are to be included in the frame in accordance with their frame allocation information, until no further capacity is available in the frame.

From the foregoing it should be appreciated that shaping parameters utilized according to embodiments of the invention provide for variable allocation of current frame capacity, rather than in static, fixed allocation (e.g., a predetermined number of bits) or fixed allocation range (e.g., a predetermined minimum and peak bandwidth in number of bits) as is typical of the prior art. For example, frame allocation information of shaping parameter sets utilized according to embodiments of the invention provide for a percentage of the current payload capacity of the frame to be initially allocated to data packets of an associated queue.

One or more attribute of the shared resource may vary over time resulting in variations in the capacity available through the resource. For example, the link capacity of a shared wireless link may change over time due to variations in channel conditions (e.g., interference, physical changes in the link space, etc.). The aforementioned variable allocation of frame capacity provided through use of shaping parameters of embodiments facilitates the adaptation of the capacity allocation to correspond to the capacity available with respect to the shared resource. For example, resource adaptation logic 133 may operate to monitor one or more attribute (e.g., signal to noise ratio, bit error rate, modulation level, data transfer rate, etc.) of the shared resource to determine the available capacity. Such shared resource capacity information may be provided by resource adaptation logic 133 to traffic shaping logic 131 for use in determining the data packets of queues 120 to be included in the frame being generated (e.g., frame 132-1). The foregoing capacity information may comprise instantaneous capacity information (e.g., the capacity available with respect to an immediate past frame or the current frame being generated) or historical (e.g., the average capacity available with respect to a sliding window of past frames). Accordingly, resource adaptation logic 133 may utilize historical information, such as may be stored in a historical database (not shown) of resource adaptation logic 133 and/or a historical database (e.g., historical database 132-2 of scheduling logic 132) otherwise available to adaptation logic 133.

It should be appreciated that multiple shaping parameter sets may be utilized with respect to the queues according to embodiments herein. For example, a first shaping parameter set may establish a queue hierarchy and frame allocation in which a subset of the queues (e.g., queues 121 and 122) are initially allocated the full capacity of the frame by traffic shaping logic 131 (e.g., the queue hierarchy establishing queues 121 and 122 as the highest priority queues and the frame allocation information allocating 75% of the frame capacity to queue 121 and 25% of the frame capacity to queue 122). The use of such a shaping parameter set may result in starving (i.e., failing to serve or under serving) traffic of queues 123 and 124 (although, as will be better understood from the discussion which follows, the multi-part transmission frame generation process of embodiments herein operates to mitigate the potential for such starvation). Accordingly, the use of a plurality of shaping parameter sets may be implemented (e.g., interleaved, periodic, aperiodic, etc.) to vary the foregoing initial capacity allocation in one embodiment of a fairness scheme. For example, a second shaping parameter set may establish a queue hierarchy and frame allocation in which all of the queues (e.g., queues 121-124) are initially allocated capacity of the frame by traffic shaping logic 131 (e.g., the queue hierarchy establishing a hierarchy from queue 121-124 and the frame allocation information allocating 50% of the frame capacity to queue 121, 20% of the frame capacity to queue 122, 15% of the frame capacity to queue 123, and 15% of the frame capacity to queue 124). The use of such a shaping parameter set may result in the initial allocation of frame capacity to a queue having insufficient traffic to consume the allocated capacity, however the multi-part transmission frame generation process of embodiments herein opportunistically reallocates such unused capacity.

The aforementioned different shaping parameter sets may be utilized for purposes in addition to or in alternative to implementing a fairness scheme as described above. For example, a plurality of shaping parameter sets may be utilized in providing a multi-part transmission frame generation process according to embodiments herein, such as wherein a first shaping parameter set is utilized in initially allocating frame capacity and a second shaping parameter set is utilized in allocating unused frame capacity. Additionally or alternatively, a plurality of shaping parameter sets may be provided, wherein ones of the shaping parameter sets are configured for particular traffic conditions (e.g., particular relative distributions of traffic types sharing the network resource), particular communication environment conditions (e.g., interference conditions, loading, etc.), particular time periods (e.g., time of day, day of week, season, etc.), and/or the like.

The foregoing traffic shaping parameters may be created, such as by a network operator, user, etc., to provide desired levels of QoS, network performance, etc. For example, traffic shaping parameters may be predetermined (e.g., prior to deployment of the network device), established ad hoc (e.g., at time of deployment, during system maintenance, etc.), established dynamically (e.g., as attributes of the shared network resource change, when undesired performance is experienced, etc.), and/or the like. Accordingly, traffic shaping parameters may be created/revised based upon predicted network operation, simulations, empirical data, etc. As will be appreciated from the discussion which follows, traffic shaping parameters of embodiments herein are created/revised under control of scheduling logic 132 to facilitate opportunistic resource sharing herein. Such revising of traffic shaping parameters may be instantaneous (e.g., a traffic shaping parameters for a next frame are revised based upon information from an immediately previous frame) or normalized (e.g., traffic shaping parameters for a next frame are revised based upon time-averaged information from a plurality of previous frames). Normalized traffic shaping parameter revision may be utilized to avoid hysteresis in the revisions, whereas the use of instantaneous traffic shaping parameter revision may react to peaks more accurately.

Scheduling logic 132 of embodiments is operable to analyze the frame capacity allocations as initially made using traffic shaping logic 131 for a frame being generated (e.g., frame 132-1) to determine if excess capacity remains (e.g., determine if frame capacity remains available after frame capacity committed to data packet transport and frame capacity otherwise utilized, such as by burst traffic, is subtracted from the total frame capacity or predicted frame capacity). For example, scheduling logic 132 may analyze the initial allocation of capacity within the frame being generated (e.g., frame 132-1) as made using traffic shaping logic 131 to determine that some capacity thereof remains available (e.g., one or more of the queues selected in accordance with traffic shaping logic 131 did not possess a sufficient number of data packets to fill its allocated capacity, a number of queues which aggregate to less than 100% capacity were selected, etc.). Scheduling logic 132 of embodiments may then operate to implement an opportunistic scheme for including additional data packets in the frame and thereby fill the excess capacity, such as by again applying traffic shaping logic (e.g., using a same or different set of shaping parameters) to the data packet queues. For example, scheduler 130 may then again run traffic shaping logic 131 on each active queue in priority sequence to remove the appropriate amount of data and place it within the frame being generated.

The unused capacity can be allocated to data packets of the active queues through application of traffic shaping logic 131 by scheduling logic 132 using a variety of scheduling approaches. For example, such application of traffic shaping logic 131 by scheduling logic 132 of embodiments may implement a priority allocation basis, whereby each queue is given the opportunity to utilize the entire unallocated capacity. Additionally or alternatively, the application of traffic shaping logic 131 by scheduling logic 132 may implement a fair distribution algorithm that assigns a portion of the unused capacity to each active queue based on QoS parameters such as throughput, latency and jitter. Likewise, application of traffic shaping logic 131 by scheduling logic 132 may operate to divide the unused capacity equally among the active queues or by dividing the unused capacity based on the instantaneous demand as determined by the amount of data in each queue. Irrespective of the particular technique implemented for allocating the capacity unused in the initial frame capacity allocation, the foregoing operates to provide an opportunistic resource sharing multi-part transmission frame generation process which may achieve 100% wireless link utilization through transmission of full capacity frames while allowing selection and configuration of different priorities for different traffic flows.

To facilitate the foregoing operation of scheduling logic 132 identifying and allocating unused capacity within a frame being generated (e.g., frame 132-1), resource adaptation logic 133 of embodiments provides information to scheduling logic 132 (e.g., every wireless frame) about the characteristics of the shared resource. For example, where the shared resource comprises a wireless link, the information provided by resource adaptation logic 133 may comprise coding, modulation, throughput, etc.

Each time scheduler 130 runs traffic shaping logic 131 to determine how much data can be processed for a given queue of queues 120, it is said to have "visited" that queue. In order to reduce the amount of times scheduler 130 visits the queues within a given scheduling cycle, scheduler 130 of embodiments applies predictive tuning of the shaping parameters based on historical link utilization statistics. Accordingly, in addition to or in the alternative to using the foregoing information provided by resource adaptation logic 133 for monitoring link usage and opportunistically allocating unused capacity to active queues, scheduling logic 132 of embodiments uses this information to update shaping parameters of traffic shaping logic 131 for one or more queues (e.g., each of the active queues), such as to ensure that the amount of data processed for each queue is commensurate with the committed transmission rate for that queue. Embodiments of scheduling logic 132 maintains historical database 132-2 (e.g., a circular buffer of historical statistics for each of the queues of queues 120) which includes information such as how much data was processed from the queue, what the resource capacity was for that frame, the amount of available frame space that was re-distributed among active queues, and the average link usage before the re-distribution. This information is preferably used according to embodiments to adjust the shaping parameters for each queue in advance of the next frame based on historical usage information. In effect, this provides operation to predicatively pre-distribute anticipated available capacity by traffic shaping logic 131 based on historical link utilization metrics.

In order to avoid over-allocation by a predictive algorithm, such as described above, the amount of data predicted to be available on a subsequent frame may be a fraction of the average historical available space according to embodiments. The particular fraction utilized may be adjusted upward or downward on every frame based on the instantaneous frame utilization at the end of the scheduling cycle. When there is sufficient demand for available capacity in all system queues and there is no additional frame space left at the end of a scheduling cycle, the predictive allocation fraction utilized may be decremented until it reaches zero, at which point the traffic shaping implemented for each queue is no longer being predicatively adjusted. When demand on one or more queues drops, the fraction utilized may be incremented at the end of each cycle by an amount that is based on the size of the available space until the available space at the end of the first scheduling pass becomes zero.

It should be appreciated that predictive allocation of available frame space may result in certain queues exceeding the rate defined by the shaping parameters for a period of time. The rate at which the predictive allocation ratio is incremented or decremented by scheduler 130 of embodiments may be adjusted to fine tune the effects of the predictive allocation, such as to balance scheduler work complexity reduction versus the amount of time a queue is allowed to exceed its maximum rate under congestion conditions.

Figure 3:
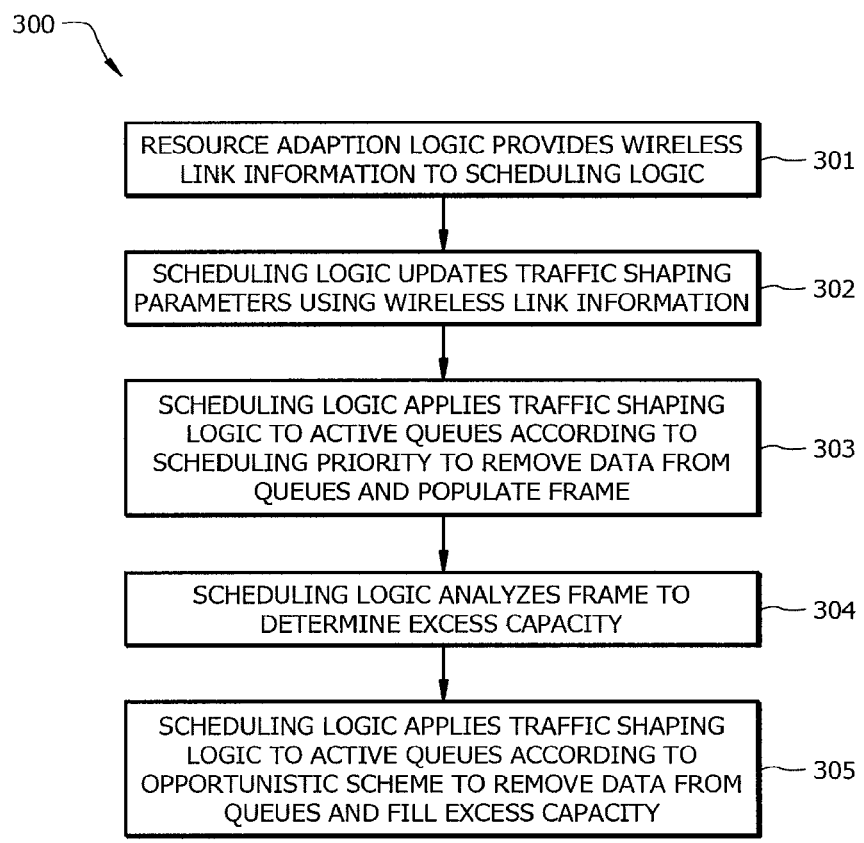
FIG. 3 shows a flow diagram of operation of a network device to provide opportunistic resource sharing according to embodiments of the invention.

Having described the functional blocks of illustrative configurations of network device 100 of FIG. 1 adapted to provide opportunistic resource sharing according to the concepts herein, attention is directed to FIG. 3 showing flow 300 setting forth a flow diagram of operation of network device 100 according to embodiments of the invention. In operation according to flow 300, it is assumed that network device 100 has been deployed and provisioned with traffic grouping information and shaping parameters selected to provide a desired, or initial, level of wireless link sharing.

Additionally, it is assumed that data packets arriving at network device 100 for transmission using the shared wireless link have been classified and placed in an appropriate queue of queues 120. For example, as packets arrive on one of the network interfaces, they are processed by classifier 110 to determine which queue of queues 120 they should be placed in.

It should be appreciated that, although flow 300 is described herein with reference to a wireless link to facilitate understanding of the concepts herein, there is no limitation to the shared resource being a wireless link. Accordingly, the concepts implemented in accordance with the embodiment of flow 300 may be applied to other shared resources, including wireline network links.

At block 301 of the illustrated embodiment, resource adaptation logic 133 provides wireless link information to scheduling logic 132. Using this wireless link information, scheduling logic 132 of embodiments updates one or more of traffic shaping parameters 131-1 through 131-4 to more effectively utilize available wireless link capacity at block 302. Thereafter, at block 303, scheduling logic 132 applies traffic shaping logic 131 to active queues of queues 120 according to the scheduling priority of shaping parameters 131-1 through 131-4 to remove data packets from selected queues and populate frame 132-1 according to the illustrated embodiment. After an initial allocation of capacity in accordance with the shaping parameters, scheduling logic 132 of embodiments analyzes the capacity allocations for the frame to determine if there is unused capacity at block 304. Where there is unused capacity, scheduling logic 132 operates to allocate the unused capacity according to an opportunistic scheme and thus fill the available capacity of the frame at block 305.

From the foregoing it can be appreciated that operation of traffic shaping logic and scheduling logic as set forth above accommodates priority based scheduling while preventing starvation with respect to low priority traffic flows and optimizing the use of available shared resource capacity. Moreover, the dynamic implementation of the capacity allocation provided by embodiments herein is particularly well suited to optimize shared resource utilization having variable capacity, such as that of a wireless link.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    determining based on a first set of traffic shaping parameters, by traffic shaping logic, an initial allocation of frame capacity of a frame to active data queues of a set of data queues that includes at least two data queues, wherein the initial allocation of the frame capacity to the active data queues allocates a percentage of the frame capacity to each active data queue in the set of data queues, different active data queues being allocated the same or different percentages of the frame capacity;
    analyzing, by scheduling logic, the frame capacity of the frame to determine whether unused frame capacity, within the frame, remains after the initial allocation of the frame capacity is used by the active data queues to which the initial allocation is made;
    in response to a determination that unused frame capacity, within the frame, remains after the initial allocation of the frame capacity is used by the active data queues to which the initial allocation is made, implementing, by the traffic shaping logic, an opportunistic scheme allocating the unused frame capacity to active data queues in said set of data queues, said opportunistic scheme allocating different percentages of the unused frame capacity to at least some active data queues than the percentages of the initial allocation of frame capacity to thereby fill at least a portion of the unused frame capacity of the frame.

2. The method of claim 1 wherein said allocating the unused frame capacity to active data queues in said set of data queues includes basing said allocation on a second set of traffic shaping parameters said second set of traffic shaping parameters being different than said first set of traffic shaping parameters.

3. The method of claim 2 wherein said second set of traffic shaping parameters are configured for particular traffic conditions, said particular traffic conditions including particular relative distributions of traffic types sharing a wireless link over which said frame is to be transmitted.

4. The method of claim 3 wherein said allocating the unused frame capacity to active data queues in said set of data queues includes basing said allocation on a third set of traffic shaping parameters in addition to said second set of traffic shaping parameters, said third set of traffic shaping parameters being configured for particular interference conditions and loading conditions on said wireless link over which said frame is to be transmitted.

5. The method of claim 2 wherein said second set of traffic shaping parameters are configured for particular time periods.

6. The method of claim 5 wherein said particular time periods include: time of day, day of week, or season of the year.

7. The method of claim 1 wherein at least one data queue of the set of data queues is associated with a particular traffic grouping of a plurality of traffic groupings of data to be transmitted through a shared network resource of a network.

8. The method of claim 7 wherein the first set of traffic shaping parameters provide queue hierarchy information.

9. The method of claim 1 further comprising monitoring signal to noise ratio, bit error rate, modulation level, and data transfer rate of a wireless link over which said frame is to be transmitted to determine the available capacity of the wireless link.

10. The method of claim 9 further comprising determining the frame capacity of the frame based on the determined available capacity on the wireless link.

11. A system comprising:
    a set of data queues that includes at least two data queues; and
    a scheduler including traffic shaping logic and scheduling logic operable to implement a multi-part transmission frame generation process wherein the multi-part transmission frame generation process comprises:

determining based on a first set of traffic shaping parameters, by the traffic shaping logic, an initial allocation of frame capacity of the frame to active data queues of the set of data queues that includes at least two data queues, wherein the initial allocation of the frame capacity to the active data queues allocates a percentage of the frame capacity to each active data queue in the set of data queues, different active data queues being allocated the same or different percentages of the frame capacity;

analyzing, by the scheduling logic, the frame capacity of the frame to determine whether unused frame capacity, within the frame, remains after the initial allocation of the frame capacity is used by the active data queues to which the initial allocation is made; and in response to a determination that unused frame capacity, within the frame, remains after the initial allocation of the frame capacity is used by the active data queues to which the initial allocation is made, implementing, by the traffic shaping logic, an opportunistic scheme allocating the unused frame capacity to active data queues in said set of data queues, said opportunistic scheme allocating different percentages of the unused frame capacity to at least some active data queues than the percentages of the initial allocation of frame capacity to thereby fill at least a portion of the unused frame capacity of the next frame.

12. The system of claim 11 wherein said allocating the unused frame capacity to active data queues in said set of data queues includes basing said allocation on a second set of traffic shaping parameters said second set of traffic shaping parameters being different than said first set of traffic shaping parameters.

13. The system of claim 12 wherein said second set of traffic shaping parameters are configured for particular traffic conditions, said particular traffic conditions including particular relative distributions of traffic types sharing a wireless link over which said frame is to be transmitted.

14. The system of claim 13 wherein said allocating the unused frame capacity to active data queues in said set of data queues includes basing said allocation on a third set of traffic shaping parameters in addition to said second set of traffic shaping parameters, said third set of traffic shaping parameters being configured for particular interference conditions and loading conditions on said wireless link over which said frame is to be transmitted.

15. The system of claim 12 wherein said second set of traffic shaping parameters are configured for particular time periods.

16. The system of claim 15 wherein said particular time periods include: time of day, day of week, or season of the year.

17. The system of claim 11 wherein at least one data queue of the set of data queues is associated with a particular traffic grouping of a plurality of traffic groupings of data to be transmitted through a shared network resource of a network.

18. The system of claim 17 wherein the first set of traffic shaping parameters provide queue hierarchy information.

19. The system of claim 11 wherein the multi-part transmission frame generation process further comprises monitoring signal to noise ratio, bit error rate, modulation level, and data transfer rate of a wireless link over which said frame is to be transmitted to determine the available capacity of the wireless link.

20. The system of claim 19 wherein the multi-part transmission frame generation process further comprises determining the frame capacity of the frame based on the determined available capacity on the wireless link.

* * * * *